(12) United States Patent
Papke

(10) Patent No.: US 6,651,413 B2
(45) Date of Patent: Nov. 25, 2003

(54) MULTIPLE BELT MULE DRIVE APPARATUS AND SYSTEMS/VEHICLES USING SAME

(75) Inventor: Clark S. Papke, Cortland, NE (US)

(73) Assignee: Exmark Manufacturing Company, Incorporated, Beatrice, NE (US)

( * ) Notice: Subject to any disclaimer, the term of this patent is extended or adjusted under 35 U.S.C. 154(b) by 0 days.

(21) Appl. No.: 09/897,591

(22) Filed: Jul. 2, 2001

(65) Prior Publication Data

US 2003/0000191 A1 Jan. 2, 2003

(51) Int. Cl.[7] ............................................. A01D 69/00
(52) U.S. Cl. ..................................... 56/11.4; 474/85
(58) Field of Search .......................... 56/11.4, 11.6, 56/14.7, 16.7, 255; 172/35, 40, 100; 474/84, 85

(56) References Cited

U.S. PATENT DOCUMENTS

| | | | | |
|---|---|---|---|---|
| 2,941,347 A | * | 6/1960 | Strom | 56/12.7 |
| 2,974,537 A | * | 3/1961 | Wheeler | 474/4 |
| 3,283,486 A | | 11/1966 | Marek et al. | |
| 3,311,186 A | | 3/1967 | Kamlukin | |
| 3,465,607 A | | 9/1969 | Erdman | |
| 3,518,821 A | * | 7/1970 | Parker | 56/11.6 |
| 3,841,425 A | * | 10/1974 | Harkness | 180/300 |
| 3,919,893 A | | 11/1975 | Boehm et al. | |
| 4,020,619 A | * | 5/1977 | Massaro | 56/11.2 |
| 4,102,114 A | | 7/1978 | Estes et al. | |
| 4,144,772 A | | 3/1979 | Brackin et al. | |
| 4,187,924 A | | 2/1980 | Deschamps | |
| 4,320,616 A | * | 3/1982 | Marto | 56/17.2 |
| 4,325,210 A | | 4/1982 | Marto | |
| 4,558,558 A | * | 12/1985 | Horner et al. | 180/19.3 |
| 4,664,645 A | * | 5/1987 | Muck et al. | 474/84 |
| 4,941,864 A | | 7/1990 | Bottum | |
| 5,177,942 A | | 1/1993 | Hager et al. | |
| 5,730,671 A | * | 3/1998 | Brewer | 474/85 |
| 5,797,251 A | | 8/1998 | Busboom | |
| 5,826,414 A | * | 10/1998 | Lenczuk | 56/14.7 |
| 5,865,020 A | | 2/1999 | Busboom et al. | |
| 6,301,863 B1 | * | 10/2001 | Liebrecht | 56/12.7 |

OTHER PUBLICATIONS

Laser Z™ Parts Manual, Exmark Mfg. Co. Inc., NE, 1997, pp. 1–34.

Deutschman et al., "Chapter 12: Belt and Chain Drives", *Machines Design*, Macmillan Publishing Co., Inc., New York, 1975, p. 668.

* cited by examiner

Primary Examiner—Thomas B. Will
Assistant Examiner—Nathan Mammen
(74) Attorney, Agent, or Firm—Mueting, Raasch & Gebhardt, P.A.

(57) ABSTRACT

Multiple belt mule drive apparatus and systems for use with ground maintenance vehicles are provided. The apparatus may include two endless belts each engageable with a drive sheave of a prime mover and a driven sheave of a cutting deck. Each drive belt may further contact a guide pulley and an idler pulley on a tension side and a slack side of the belt, respectively. In one embodiment, the drive sheave has an axis generally parallel to a longitudinal axis of the vehicle. Preferably, the guide pulley and the idler pulley associated with the first endless belt are, when the vehicle is in an operating configuration, located on a first side of a vertical plane passing through the drive sheave axis, while the guide pulley and idler pulley associated with the second endless belt are located on a second side.

29 Claims, 6 Drawing Sheets

MULTIPLE BELT MULE DRIVE APPARATUS AND SYSTEMS/VEHICLES USING SAME

TECHNICAL FIELD

The present invention relates generally to maintenance vehicles having ground-engaging implements attached thereto and, more particularly, to belt drive systems adapted to deliver power to such implements from a vehicle prime mover.

BACKGROUND

Ground maintenance vehicles adapted to support and operate any one of a number of ground-engaging implements are known. For instance, riding tractors may support such implements as cutting decks, snow throwers, sweepers, etc. While some of these implements may be self-powered, e.g., tow-behind cutting decks having on-board engines, other implements typically receive take-off power from a drive shaft of the vehicle's prime mover, e.g., engine. While the present invention is applicable to drive systems for use with most any ground maintenance vehicle and implement combination, it will, for the sake of brevity, be described with respect to commercial riding mowers having belly-mounted cutting decks.

For mowers having large engines, e.g., 20 horsepower (hp) or more, the engine may be mounted such that the engine drive or output shaft axis is oriented horizontally. The cutting deck, on the other hand, typically has a driven shaft having an axis that is oriented vertically. As a result, in order to deliver power to the cutting deck, rotary motion about the horizontal drive shaft must be converted to rotary motion about the vertical driven shaft.

Generally speaking, take-off power is provided to the cutting deck via either a belt drive system or a shaft drive system (or a combination of both). Shaft drive systems deliver rotational power through a driven shaft via appropriate gearing mechanisms and couplings.

While beneficial for many applications, shaft drive systems have drawbacks. For instance, shaft drive systems require numerous parts, e.g., bearings and gear boxes, as well as adequate structure to support the same. As a result, the cost and complexity is generally perceived to be higher than that for belt drive systems. Moreover, depending on the particular configuration, shaft drive systems may require increased maintenance, e.g., lubrication of bearings and gears, when compared to belt drive systems.

In typical belt drive systems found on riding lawn mowers, an endless belt extends between a vertical drive sheave attached to the horizontal drive shaft and a horizontal driven sheave attached to the vertical driven shaft. Belt drive systems in which the drive shaft axis and the driven shaft axis are not parallel and may even be perpendicular or approximately perpendicular to one another (or at least lie in separate planes that may be perpendicular or approximately perpendicular to one another) are often referred to in the art as mule drive systems. An example of a mule drive system for use with a riding tractor is found in U.S. Pat. No. 4,325,210 (Marto). To accommodate belt interconnection between the vertical drive sheave and the horizontal driven sheave, two idler sheaves are typically provided. The idler sheaves may generally be mounted in vertical planes for rotation about a transverse, horizontal axis.

While mule drive systems avoid some of the disadvantages of shaft drive systems, problems remain. For example, the horsepower carried by the belt is limited by its cross-sectional size, e.g., belts having larger cross-sections are able to transmit more power than those having smaller cross-sections. Although able to transmit correspondingly greater power, belts of larger cross-section have more limited rates of belt twist. As a result, as the size of the belt cross-section increases, the distance between the drive sheave and the idler pulleys must also generally increase.

To accommodate this increased spacing between the drive sheave and idler pulleys, either the drive sheave, e.g., the engine, may be raised or the idler pulleys may be lowered. Since the space available to lower the idler pulleys is limited, raising the engine is a more common solution. Raising the engine, however, results in an undesirably higher center of gravity for the mower.

SUMMARY OF THE INVENTION

Mule drive apparatus in accordance with the present invention overcome the above-identified problems and disadvantages by providing apparatus utilizing multiple mule drives, e.g., a first and a second drive belt each routed between a drive sheave and a driven sheave. As a result, belts having a smaller cross-section may be used without sacrificing total power transmission capacity, i.e., power transmission may be split between the two or more belts. In addition, apparatus of the present invention locate the idler pulleys at a more outboard location relative to the drive sheave. Therefore, the engine may be lowered while maintaining the desired distance between the drive sheave and the idler pulleys. By maintaining a lowered engine position, vehicles utilizing dual mule drive apparatus in accordance with the present invention are able to provide a vehicle having a lower center of gravity as compared to vehicles using conventional mule drive systems.

In one exemplary embodiment, a mule drive apparatus for delivering power to a cutting deck attached to a lawn mowing vehicle is provided, where the apparatus includes a powered drive sheave operable to rotate about a drive sheave axis. A driven sheave coupled to the cutting deck is also included wherein the driven sheave is operable to rotate about a driven sheave axis. The mule drive apparatus also includes a first endless belt and a second endless belt, each of the first endless belt and the second endless belt operable to frictionally engage both the drive sheave and the driven sheave.

In another embodiment, a mule drive apparatus for delivering power to a cutting deck attached to a lawn mowing vehicle is provided. The apparatus includes a drive sheave operable to engage a power take-off shaft of the vehicle, where the drive sheave is operable to rotate about a drive sheave axis. Further included is a driven sheave adapted to couple to the cutting deck where the driven sheave is operable to rotate about a driven sheave axis. A first endless belt and a second endless belt are also included where each of the first endless belt and the second endless belt is operable to frictionally engage both the drive sheave and the driven sheave. Positionable along a tension side of the first endless belt is a first guide pulley while a second guide pulley is positionable along a tension side of the second endless belt. A first idler pulley is positionable along a slack side of the first endless belt and a second idler pulley is positionable along a slack side of the second endless belt.

In yet another embodiment, a lawn mowing vehicle is provided. A cutting deck is attached to the vehicle as is a prime mover operable to provide power to at least the cutting deck. The vehicle further includes: a mule drive apparatus for delivering power to the cutting deck where the mule drive apparatus includes a drive sheave engageable with a power take-off shaft of the prime mover, the drive sheave operable to rotate about a drive sheave axis; and a driven sheave coupled to the cutting deck, the driven sheave operable to rotate about a driven sheave axis. Also included with the mule drive apparatus is a first endless belt and a second endless belt, where each of the first endless belt and the second endless belt is operable to wrap around and frictionally engage both the drive sheave and the driven sheave.

In still yet another embodiment, a method for providing power to a cutting deck of a lawn mowing vehicle is provided. The method includes coupling a first endless belt around both a drive sheave of a power take-off shaft and a driven sheave of the cutting deck. A tension side of the first endless belt is placed in contact with a first guide pulley and a slack side of the first endless belt is placed in contact with a first idler pulley. The method also includes coupling a second endless belt around both the drive sheave of the power take-off shaft and the driven sheave of the cutting deck. A tension side of the second endless belt is placed in contact with a second guide pulley and a slack side of the second endless belt is placed in contact with a second idler pulley.

The above summary of the invention is not intended to describe each embodiment or every implementation of the present invention. Rather, a more complete understanding of the invention will become apparent and appreciated by reference to the following detailed description and claims in view of the accompanying drawings.

BRIEF DESCRIPTION OF THE DRAWINGS

The present invention will be further described with reference to the drawings, wherein:

FIG. 3 is a rear elevation view of the dual mule drive apparatus of FIG. 1, with various structure/components removed for clarity;

DETAILED DESCRIPTION OF EXEMPLARY EMBODIMENTS

In the following detailed description of the embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
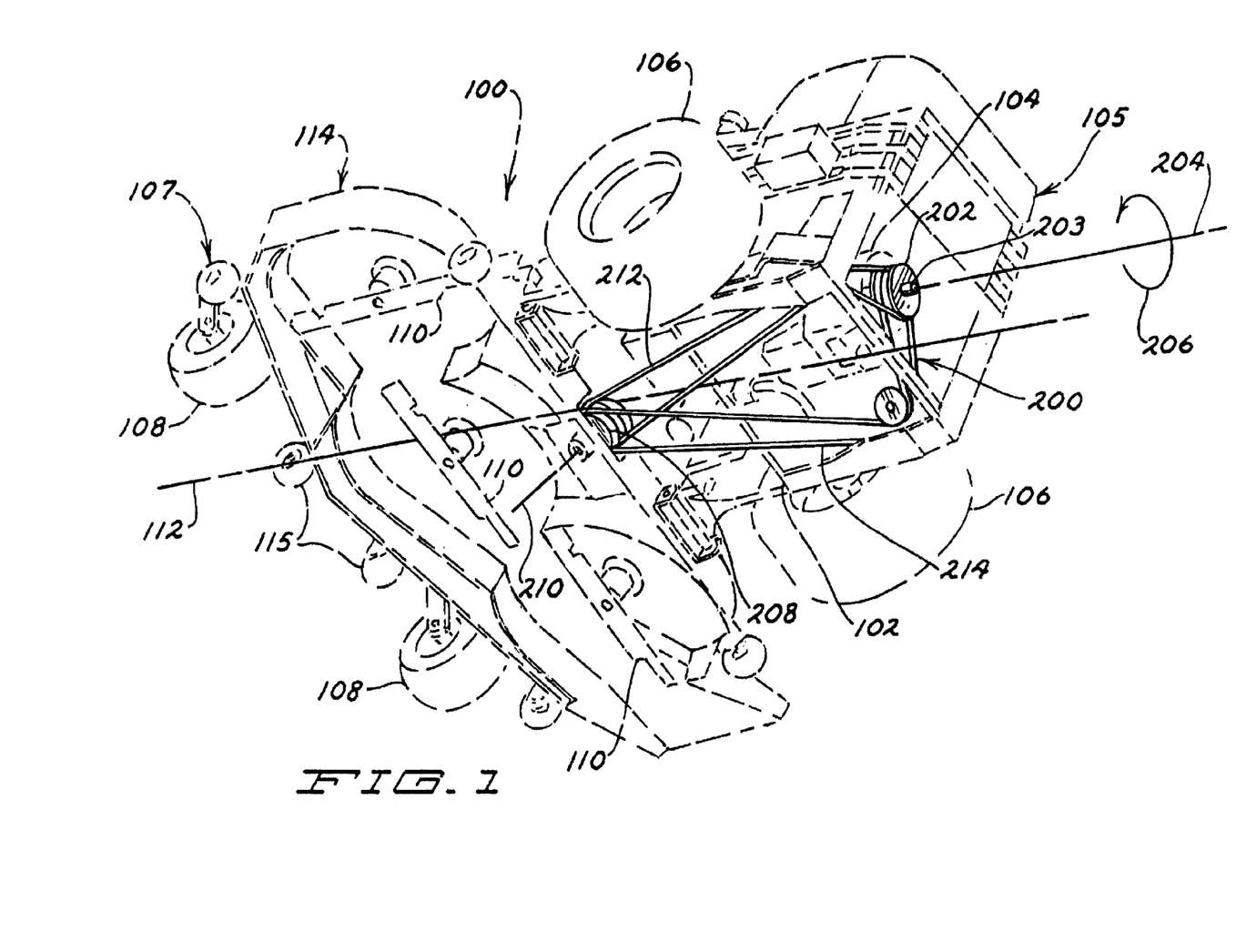
FIG. 1 is a bottom perspective view of a riding lawn mower having a dual mule drive apparatus in accordance with the present invention.

FIG. 1 shows a dual mule drive apparatus 200 in accordance with one embodiment of the present invention as it may be incorporated on a self-propelled vehicle, e.g., a commercial riding lawn mower 100. While, for the sake of brevity, the invention is herein described with respect to commercial-grade riding lawn mowing vehicles (hereinafter generically referred to merely as "vehicles" or "mowers"), those of skill in the art will realize that the present invention is applicable to mule drive apparatus for use with most any ground maintenance vehicle having most any implement, e.g., walk-behind mower, garden tractor, aerator, dethatcher, snow thrower, tiller, etc.

While the general construction of the mower 100 is not considered central to the invention, it will now be briefly described. FIG. 1 illustrates an exemplary mower 100 (shown primarily in broken lines) from a bottom perspective view. The mower 100 illustrated includes a frame 102 that, among others, supports a prime mover, e.g., internal combustion engine 104 or the like (electric motor, for example). A pair of transversely opposing, ground engaging drive wheels 106 may support the rear of the mower 100 in rolling engagement with the ground. Each drive wheel 106 may be powered in accordance with known methods. For example, direct mechanical drive systems such as those utilizing gearboxes, shafts, and/or pulleys are possible. Preferably, each drive wheel 106 includes a separate hydraulic motor (not shown) which receives hydraulic power from one or more hydraulic pumps (also not shown) powered by the engine 104.

Operator controls (not shown) permit independent control of the speed and direction of each drive wheel 106, thus allowing control of the speed and direction of the mower 100. A pair of front swiveling caster wheels 108 are preferably connected to a forward portion of the mower 100 to support the remaining weight of the mower in rolling engagement with the ground.

Although the illustrated mower has the drive wheels 106 at a first or aft end 105 of the mower 100 and the caster wheels 108 at a second or forward end 107, this configuration is not limiting. For example, other embodiments may reverse the location of the wheels, e.g., drive wheels forward and caster wheels aft. Moreover, other configurations may use different wheel configurations altogether, e.g., a tri-wheel configuration. These and other embodiments are possible without departing from the scope of the invention.

A cutting deck 114 may be mounted to a lower side of the mower 100, e.g., on the underside of the frame 102, generally between the drive wheels 106 and the caster wheels 108. The cutting deck 114 may include one or more cutting blades 110 or the like (e.g., cutting line) as known in the art. A drive system, as further described below, may selectively couple the cutting deck 114 to the engine 104 so that, during operation, power may be delivered to the cutting deck 114, whereby the blades 110 rotate at a speed sufficient to cut grass and other vegetation. The cutting deck 114 may optionally include deck rollers 115 to further support the cutting deck 114 relative to the ground during operation.

In accordance with the present invention, power is provided to the cutting deck 114 from the engine 104 through a dual mule drive apparatus 200 of which exemplary embodiments are illustrated in FIGS. 1–4. While the present invention is described with respect to dual mule drive apparatus, other multiple mule drive systems are also possible within the scope of the invention. As FIG. 1 shows, the engine 104 preferably includes a power take-off (PTO) shaft 203 which, in the illustrated embodiments, extends rearwardly from the aft end 105 of the mower 100. A drive sheave 202 may be selectively engagable with the PTO shaft 203 as shown.

As used herein, relative terms such as "left," "right," "fore," "forward," "aft," "rearward," "top," "bottom," "upper," "lower," "horizontal," "vertical," and the like are from the perspective of one operating the mower 100 while the mower is in an operating configuration, e.g., while the mower 100 is positioned such that the wheels 106 and 108 rest upon a horizontal ground plane 248 (see FIG. 3). These terms are used herein to simplify the description, however, and not to limit the scope of the invention in any way.

The PTO shaft 203 is operable to rotate about a drive sheave axis 204 which, in the illustrated embodiment, is generally parallel to a longitudinal axis 112 (e.g., a generally symmetric axis running from the forward end 107 of the vehicle to the aft end 105) of the mower 100. The PTO shaft 203 is capable of rotating in at least a first direction 206 as indicated in FIG. 1.

Rotatably coupled to the cutting deck 114 is a driven sheave 208 adapted to permit rotation about a driven sheave axis 210. The driven sheave axis 210 may preferably (though not necessarily) form a line (see FIG. 3) normal to a horizontal plane containing the drive sheave axis 204. The driven sheave 208 may further be coupled (e.g., via an endless belt or the like) to one or more spindles (not shown) attached to cutting blades 110 for rotating the latter during operation.

Figure 2:
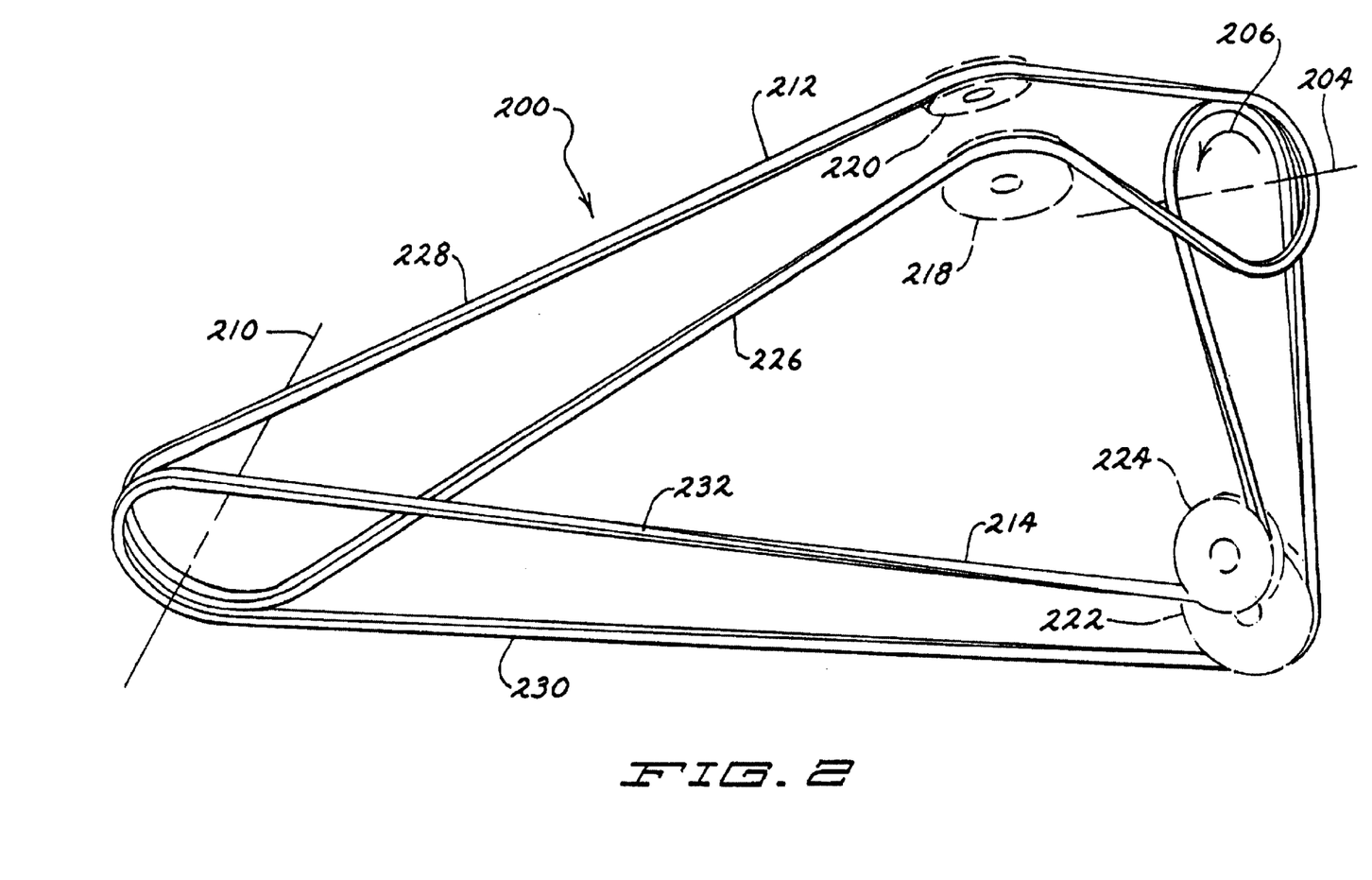
FIG. 2 is an enlarged partial perspective view of the dual mule drive apparatus of FIG. 1, with various structure/components removed for clarity.

A first endless belt 212 and a second endless belt 214 transmit power from the drive sheave 202 to the driven sheave 208. FIG. 2 shows the routing of the belts 212 and 214 in accordance with one embodiment of the invention. For clarity, mower structure, e.g., frame 102 and engine 104, as well as the drive sheave 202 and the driven sheave 208, are removed from this view. While illustrated as V-belts, other power transmitting devices, e.g., toothed belts, cables, etc., could also be used.

To guide and tension the belts 212 and 214 as the driven sheave 202 (see FIG. 1) rotates in the direction 206, intermediate sheaves or pulleys are provided. For example, a first guide pulley 218 may be positioned for contact with a tension side 226 of the first endless belt 212 and a second guide pulley 222 may be positioned for contact with a tension side 230 of the second endless belt 214. Further, a first idler pulley 220 may be positioned for contact with a slack side 228 of the first endless belt 212 and a second idler pulley 224 may be positioned for contact with a slack side 232 of the second endless belt 214.

The first and second guide pulleys 218, 222 may be secured such that a respective rotational axis of each guide pulley remains fixed relative to the mower 100, e.g., fixed relative to the mower frame 102. The first and second idler pulleys 220 and 224, on the other hand, may be secured such that a respective rotational axis of each idler pulley is biased relative to the mower 100 as further explained below. This configuration maintains the desired tension on the slack side of each of the belts 212 and 214.

FIG. 3 illustrates a rear elevation view of the mower 100 with structure/components removed to more clearly illustrate the dual mule drive apparatus 200. The first endless belt 212 preferably rides along a surface, e.g., within a first groove 234 (see FIG. 4), of the drive sheave 202 as well as within a first groove 240 of the driven sheave 208. The slack side 228 of the first endless belt 212 may ride along a surface, e.g., within a groove, of the first idler pulley 220, while the tension side 226 may ride within a groove of the first guide pulley 218.

In similar fashion, the second endless belt 214 may ride along a surface, e.g., within a second groove 236 (see FIG. 4), of the drive sheave 202 as well as within a second groove 242 of the driven sheave 208. A third groove 244 in the driven sheave 208 may be provided to transmit rotational power to spindles (not shown) coupled to the cutting blades 110. The slack side 232 of the second guide belt 214 may ride along a surface, e.g., within a groove, of the second idler pulley 224 while the tension side 230 may ride within a groove in the second guide pulley 222.

Figure 4:
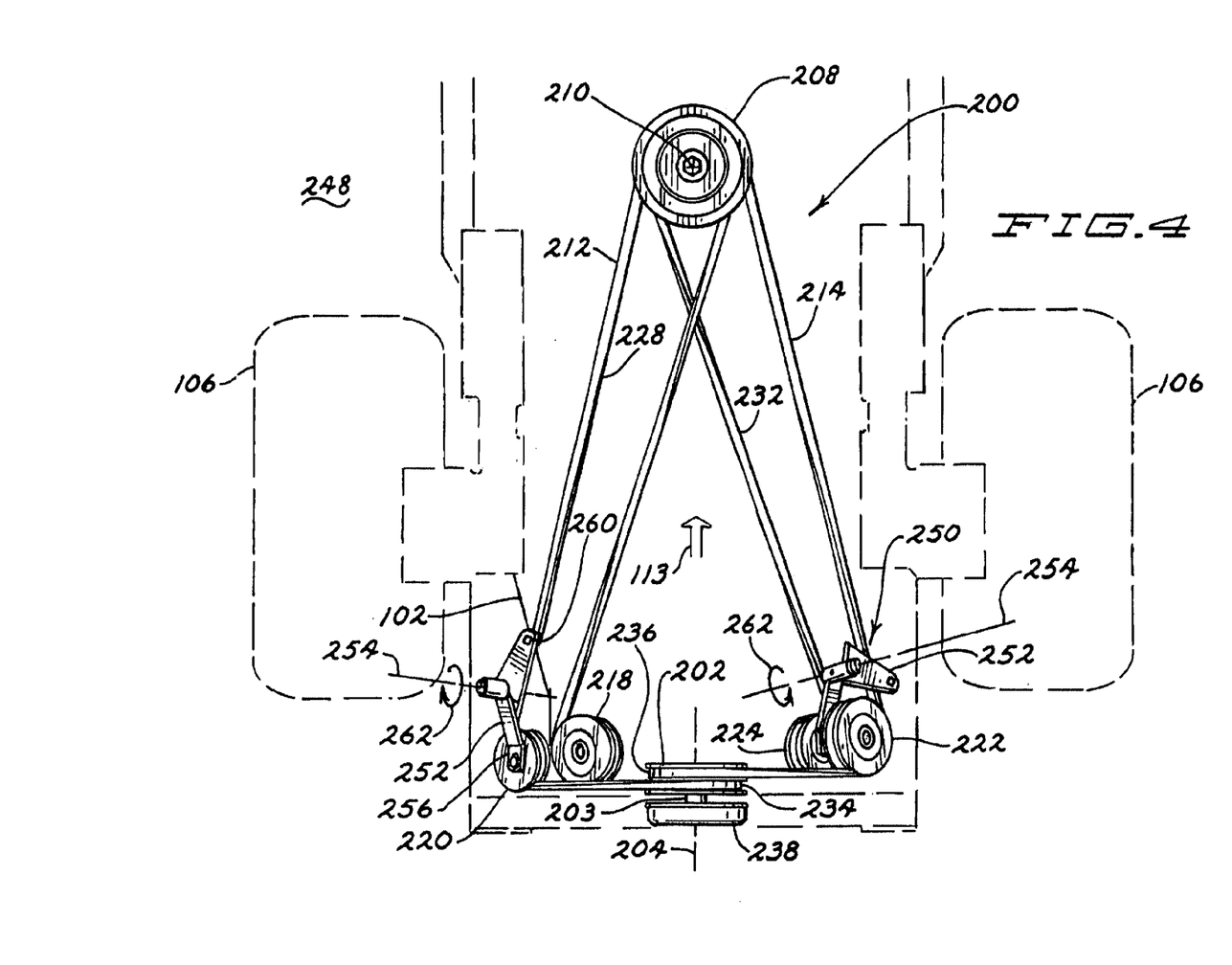
FIG. 4 is a top plan view of the dual mule drive apparatus of FIG. 1, with various structure/components removed for clarity.

FIG. 4 illustrates the dual mule drive apparatus 200 from a top plan view. As shown in this view, a clutching device, e.g., an electric clutch-brake 238 or other clutching device as known in the art (e.g., a centrifugal clutch), may be provided to permit selective coupling of the drive sheave 202 to the PTO shaft 203. For clarity, structure/components, e.g., engine 104 and cutting deck 114, are removed from this view.

FIGS. 3 and 4 further illustrate exemplary belt tensioning devices 250 for maintaining tension along the slack sides 228 and 232 of the first endless belt 212 and the second endless belt 214, respectively. Each belt tensioning device 250 may include a bell crank 252 (see FIG. 4) pivotally attached to the frame 102 of the mower 100 for pivoting about a bell crank pivot axis 254. The respective idler pulley 220 (or 224) is attached to a first end 256 (FIG. 4) of the bell crank 252 and a tension spring 258 (FIG. 3) is attached to a second end 260 (FIG. 4). The tension spring 258 is, in turn, attached to the frame 102 (FIG. 3). The spring 258 may bias the bell crank 252 in a direction 262 about the pivot axis 254 (FIG. 4). This biasing force causes the respective idler pulleys 220 and 224 to maintain the desired tension in the belts 212 and 214.

As illustrated in FIGS. 1–4, the drive sheave axis 204 (see FIG. 1) may be oriented generally parallel to the longitudinal axis 112 of the mower 100. The first guide pulley 218 and the first idler pulley 220 are preferably located outboard to a first side of the drive sheave axis 204 and downward relative thereto (see FIG. 3). Similarly, the second guide pulley 222 and the second idler pulley 224 are preferably located outboard to a second side of the drive sheave axis 204 and downward relative thereto, where the second side of the drive sheave axis 204 transversely opposes the first side.

Stated another way, the first guide pulley 218 and the first idler pulley 220 may, when the mower 100 is in the operating configuration as shown in FIG. 3, be positioned on a first side of a vertical plane (represented as "V" in FIG. 3) passing through the drive sheave axis 203, and the second guide pulley 222 and the second idler pulley 224 may be located on a second side of the vertical plane V. Further, the first guide pulley 218, the first idler pulley 220, the second guide pulley 222, and the second idler pulley 224 may be located on a first, e.g., lower, side of a horizontal plane (represented as "H" in FIG. 3) passing through the drive sheave axis 204, e.g., located between the ground plane 248 and the generally parallel horizontal plane H passing through the drive sheave axis 204.

In other embodiments, the guide pulleys 218, 222 and the idler pulleys 220, 224 may optionally be located on an upper side of the horizontal plane H passing through the drive sheave axis 204. In still other embodiments, the guide pulleys 218, 222 and the idler pulleys 220, 224 could be located on the same side of the vertical plane V passing through the drive sheave axis 203, e.g., the first guide pulley 218 and the first idler pulley 220 could be located above the horizontal plane H passing through the drive sheave axis 204 and the second guide pulley 222 and the second idler pulley 224 could be located below the horizontal plane H. Accordingly, various configurations are certainly possible without departing from the scope of the invention.

Figures 5A, 5B:
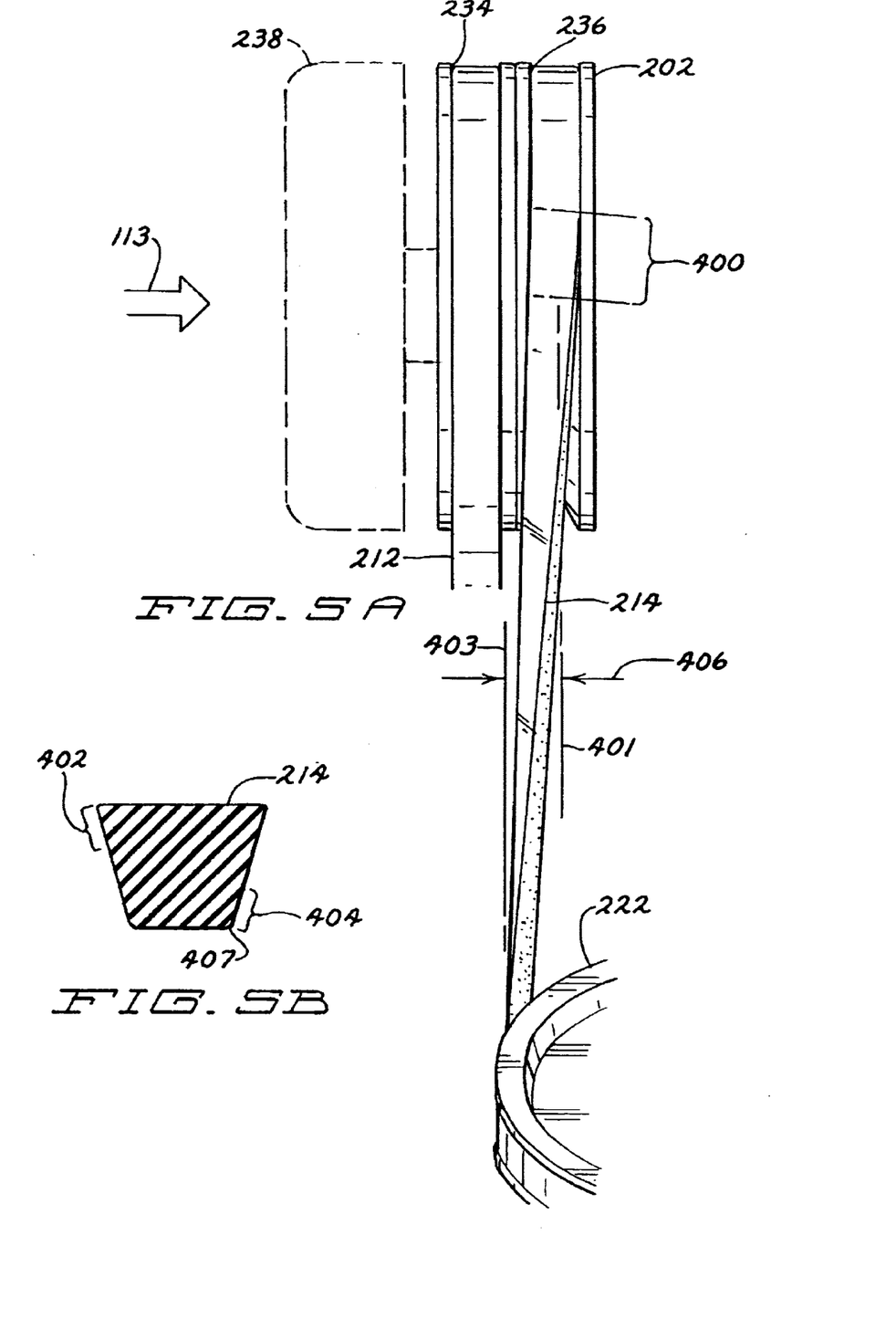
FIG. 5A is an enlarged view of a portion of the dual mule drive apparatus of FIG. 1 illustrating an exemplary drive sheave geometry.
FIG. 5B is a cross-section of an exemplary V-belt for use with dual mule drive apparatus of the present invention.

The drive sheave 202 may be offset slightly forwardly, e.g., in the direction 113 as shown in FIGS. 4 and 5A, relative to the first and second guide pulleys 218, 222. For example, a first vertical plane 401 containing the centerline of the groove 236 of the drive sheave 202 may be offset forwardly by a distance 406 from a second vertical plane 403 that is tangent to the pitch diameter of the belt 214 on the second guide pulley 222. "Pitch diameter" is used herein to refer to the constructive diameter of the neutral axis of the belt 214 when the belt is engaged with a particular sheave or pulley, e.g., the second guide pulley 222.

FIG. 5A shows an exemplary configuration of a forwardly offset drive sheave 202 in accordance with the present invention. While the embodiment is described and illustrated with respect to the second endless belt 214, the second guide pulley 222, and the second drive sheave groove 236 only, the first endless belt 212 may preferably engage the first drive sheave groove 234 and the first guide pulley 218 in a similar manner, unless otherwise noted.

In the embodiment illustrated in FIG. 5A, the distance 406 may be 1/16 inch to 3/16 inch and, more preferably, 1/8 inch. However, the actual offset distance is dependent on many factors including sheave separation and belt size, to name a few. Thus, other embodiments may utilize offsets of most any distance without departing from the scope of the invention.

By configuring the relative locations of the drive sheave 202 and the second guide pulley 222 as indicated in FIG. 5A, initial contact 400 between the second endless belt 214 and the surfaces of the groove 236 is preferably along a portion 402 of the belt's upper section (see FIG. 5B). In the absence of the forward bias of the drive sheave 202, the endless belt 214 may initially contact the surface of the groove 236 along a portion 404 (see FIG. 5B) of the belt's lower section. When initial contact occurs along the portion 404, premature wear of the inner belt corner 407 may result. Over time, this wear of the belt corner 407 may undesirably permit belt rolling within the groove 236.

By offsetting the drive sheave 202 forwardly as described above, wear may be reduced and correspondingly longer belt life may be achieved. Moreover, this offset has also been found to assist in guiding the belt 214 as it twists from the second guide pulley 222 onto the drive sheave 202. That is, when the drive sheave 202 is offset as described herein, the rotation of the drive sheave 202 may assist in guiding the second endless belt 214 into the groove 236. The advantages of this forward offset are obviously not limited to dual mule drive apparatus 200 as described herein but rather may be applied to most any mule drive system (e.g., single belt systems).

Dual mule drive apparatus 200 in accordance with the present invention described above provide numerous advantages over known single mule drive systems. For example, by locating the first guide pulley 218 and the first idler pulley 220 outwardly and downwardly to a first side of the drive sheave axis 204 and the second guide pulley 222 and the second idler pulley 224 outwardly and downwardly to a second side (see e.g., FIG. 3), the engine 104 may be lowered to nest in between. As a result, the engine 104 may remain low while still maintaining adequate distance for belt twist between the drive sheave 202 and the guide and idler pulleys.

Furthermore, by providing a multiple belt system, power transmission between the drive sheave 202 and the driven sheave 208 may be split between multiple, e.g., two, smaller belts rather than transmitted through one large belt. Accordingly, the distance between the drive sheave 202 and the guide pulleys 218, 222 and idler pulleys 220, 224 may be further decreased due to the greater permissible rate of belt twist for belts of smaller cross-section. In one embodiment, belts 212 and 214 are standard A-section V-belts.

Still further, the dual belts 212 and 214 of the present invention offer more symmetric loading of the PTO shaft 204 as the lateral, e.g., side-to-side, components of the respective belts may be directly opposed. This symmetric loading is believed to contribute to reduced vibration, especially when used in combination with a focused engine isolation mount system as further described below.

Yet another advantage of dual mule drive apparatus in accordance with the present invention is that the location of the first guide pulley 218 and the first idler pulley 220 yield an arc of contact 225 (see FIG. 3) between the first endless belt 212 and the drive sheave 202 of more than 180 degrees. This arc of contact between the belt 212 and the drive sheave 202 improves power transmission as compared to systems having lesser angles of contact. The location of the second guide pulley 222 and second idler pulley 224 relative to the drive sheave 202 may also provide a similarly improved arc of contact for the second endless belt 214.

Still yet another advantage of dual mule drive apparatus 200 disclosed and illustrated herein is that the first endless belt 212 and the second endless belt 214 may be of the same or generally of the same dimensions. Although generally of the same dimensions, the first endless belt 212 is preferably not formed as a matched set with the second endless belt 214, e.g., the belts 212, 214 may be replaced individually without adversely affecting drive apparatus 200 performance.

Figure 6:
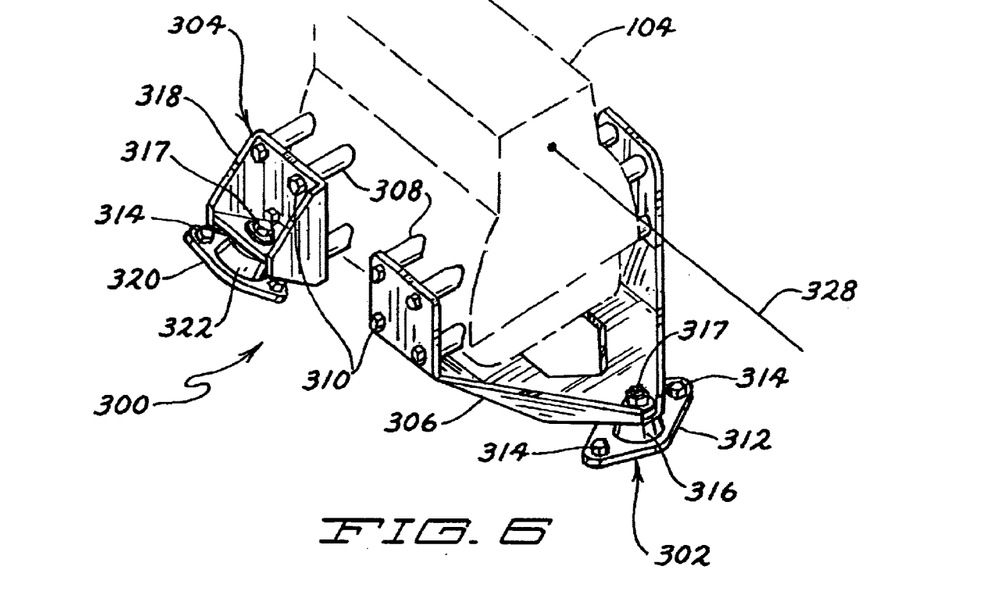
FIG. 6 is a perspective view of an engine mount system for use with a dual mule drive apparatus in accordance with the present invention.
Figure 7:
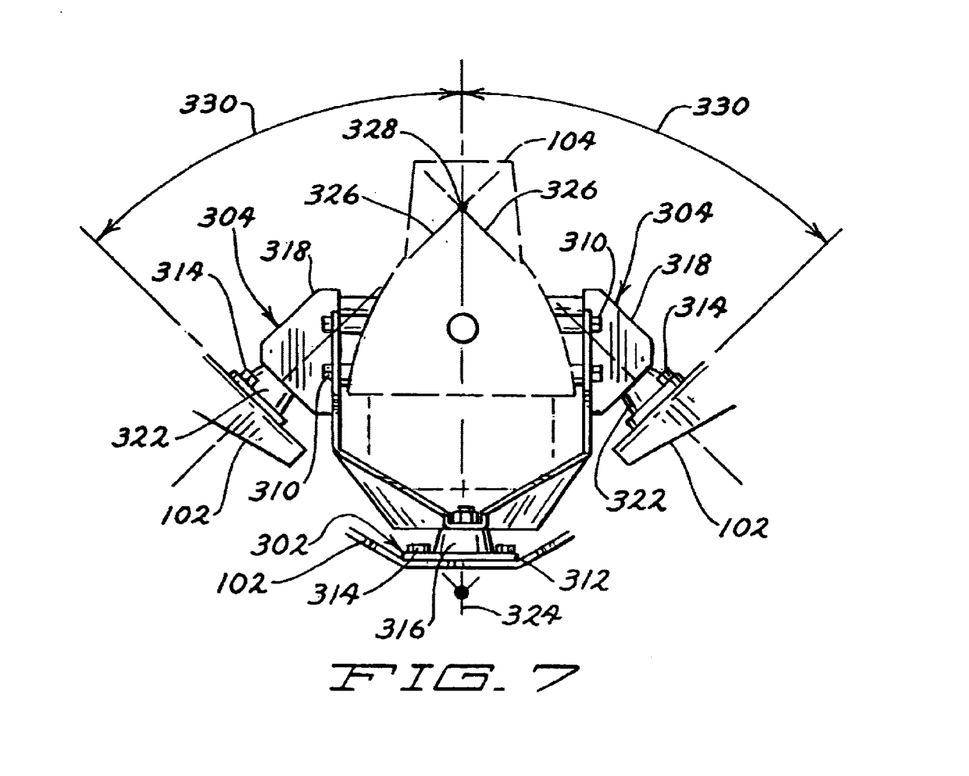
FIG. 7 is a rear elevation view of the engine mount system of FIG. 6.
Figure 9:
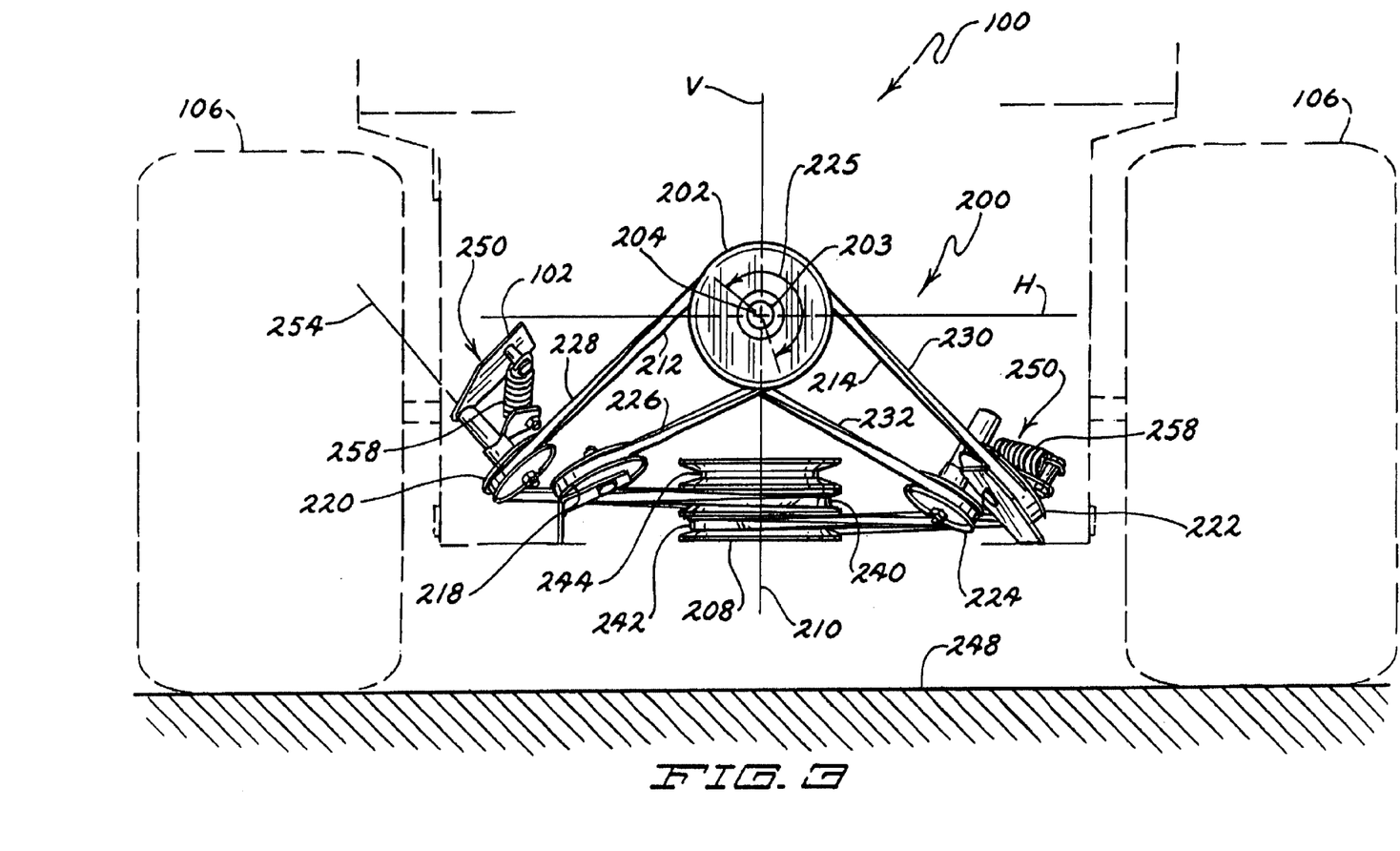

In other embodiments of the present invention, a dual mule drive apparatus as described herein may be provided in combination with a focused engine isolation mount system 300 best illustrated in FIGS. 6 and 7. As illustrated in these views, exemplary embodiments of the mount system 300 may include a central mount 302 and two lateral mounts 304. Other embodiments may include additional mounts as needed for the particular application.

The central mount 302 may include an engine isolation bracket 306 which, in the illustrated embodiment, may form a cradle which couples to transversely opposing sides of the engine 104. While most any configuration may be used to couple the engine isolation bracket 306 to the engine 104, the illustrated embodiment utilizes standoffs 308 through which fasteners 310 pass before threading into the engine 104.

The central mount 302 may further include a frame isolation bracket 312 which fastens to the mower frame 102 with fasteners 314. Sandwiched between the engine isolation bracket 306 and the frame isolation bracket 312 is an isolation pad 316. A fastener 317 may secure, e.g., clamp, the isolation pad 316 between the engine isolation bracket 306 and the frame isolation bracket 312.

Each lateral mount 304 may similarly include an engine isolation bracket 318 coupled to the engine 104 via standoffs 308 and fasteners 310 similar to the engine isolation bracket 306. The lateral mounts 304 may also include a frame isolation bracket 320 coupled to the mower frame 102 with fasteners 314. As with the central mount 302, an isolation pad 322 similar (if not identical) in most respects to the isolation pad 316 may be secured, e.g., clamped, between the engine isolation bracket 318 and the frame isolation bracket 320 with a fastener 317.

Isolation pads 316 and 322 are typically produced from a rubber compound which is preferably optimized to be "soft," e.g., to absorb energy, when loaded in shear yet remain relatively stiff when loaded in compression.

The central mount 302 may define a central mount axis 324 while each lateral mount 304 may define a lateral mount axis 326 as shown in FIG. 7. The central mount axis 324 may preferably be positioned such that it is substantially parallel to and, more preferably, coaxial with, the resultant belt force vector (the resultant force applied to the drive sheave 202 by the first endless belt 212 and the second endless belt 214).

Moreover, the axes 324 and 326 may preferably intersect at or at least near a horizontal axis 328 of the rotational center of mass of the engine 104. As a result, torsional vibration produced by the operation of the engine 104 is primarily reacted in shear through the isolation pads 316 and 322. However, the mounts 302 and 304 preferably remain rigid when the engine 104 experiences axial, e.g., vertical, accelerations.

While not limited to any particular angle, the lateral mounts 304 may be positioned at an angle 330 of between 30 degrees and 60 degrees from the axis 324 as shown in FIG. 7 and, in some embodiments, between 40 and 50 degrees. However, the actual angle 330 is dependent on many variables including, among others, mount geometry and the location of the rotational center of mass. As a result, the angle 330 may be most any value.

In addition to the reasons provided above, the focused isolation mount system described and illustrated herein may be particularly advantageous when used in conjunction with the dual mule drive apparatus 200. This is attributable, at least in part, to the generally symmetrically opposed belt loading provided by the dual mule drive apparatus.

Exemplary embodiments of the present invention are described above. Those skilled in the art will recognize that many embodiments are possible within the scope of the invention. Other variations, modifications, and combinations of the various parts and assemblies can certainly be made and still fall within the scope of the invention. For example, the drive sheave axis and the driven sheave axis may be configured in non-perpendicular and/or non-planar orientations. Thus, the invention is limited only by the following claims, and equivalents thereto.

What is claimed is:

1. A mule drive apparatus for delivering power to a cutting deck attached to a lawn mowing vehicle, the apparatus comprising:
a drive sheave operable to engage a power take-off shaft of a prime mover attached to the vehicle, the drive sheave operable to rotate about a drive sheave axis;
a driven sheave adapted to couple to the cutting deck, the driven sheave operable to rotate about a driven sheave axis;
a first endless belt and a second endless belt, each of the first endless belt and the second endless belt operable to frictionally engage both the drive sheave and the driven sheave;
a first guide pulley positionable along a tension side of the first endless belt and a second guide pulley positionable along a tension side of the second endless belt; and
a first idler pulley positionable along a slack side of the first endless belt and a second idler pulley positionable along a slack side of the second endless belt;
wherein the first guide pulley is, when the vehicle is in an operating configuration, located on a first side of a vertical plane containing the drive sheave axis and the second guide pulley is located on a second side of the vertical plane.

2. The apparatus of claim 1, wherein the driven sheave axis lies within the vertical plane.

3. The apparatus of claim 1, wherein the first idler pulley is located on the first side of the vertical plane and the second idler pulley is located on the second side.

4. The apparatus of claim 3, wherein the first guide pulley and the second guide pulley are, when the vehicle is in the operating configuration, located on a lower side of a horizontal plane passing through the drive sheave axis.

5. The apparatus of claim 4, wherein the first idler pulley and the second idler pulley are located on the lower side of the horizontal plane.

6. A dual belt, mule drive apparatus for delivering power to a cutting deck of a lawn mowing vehicle, the apparatus comprising:
a drive sheave operatively coupled to a power take-off shaft of the vehicle;
a driven sheave operatively coupled to the cutting deck;
a first endless belt and a second endless belt, each of the first endless belt and the second endless belt operable to frictionally engage both the drive sheave and the driven sheave;
a first guide pulley and a first idler pulley associated with the first endless belt, the first guide pulley and the first idler pulley located on a first side of a vertical plane containing an axis of the drive sheave; and
a second guide pulley and a second idler pulley associated with the second endless belt, the second guide pulley and the second idler pulley located on a second side of the vertical plane.

7. The apparatus of claim 6, wherein the vertical plane is intersected by a first plane containing the first idler pulley and a second plane containing the first guide pulley.

8. The apparatus of claim 7, wherein the first plane containing the first idler pulley intersects the second plane containing the first guide pulley.

9. The apparatus of claim 6, wherein the vertical plane is intersected by a third plane containing the second idler pulley and a fourth plane containing the second guide pulley.

10. The apparatus of claim 9, wherein the third plane containing the second idler pulley intersects the fourth plane containing the second guide pulley.

11. The apparatus of claim 6, wherein the first guide pulley and the first idler pulley are positioned such that an arc of contact of the first endless belt on the drive sheave is greater than 180 degrees.

12. A dual belt, mule drive apparatus for delivering power to a cutting deck of a lawn mowing vehicle, the apparatus comprising:
a drive sheave operatively coupled to a power take-off shaft of the vehicle, the drive sheave rotatable about a drive sheave axis;
a driven sheave operatively coupled to the cutting deck, the drive sheave rotatable about a driven sheave axis, the driven sheave axis being substantially perpendicular to the drive sheave axis;
a first endless belt and a second endless belt, each of the first endless belt and the second endless belt operable to frictionally engage both the drive sheave and the driven sheave;

a first guide pulley and a first idler pulley in contact with the first endless belt, the first guide pulley and the first idler pulley located outboard to a first side of the drive sheave axis and downward relative thereto; and a second guide pulley and a second idler pulley in contact with the second endless belt, the second guide pulley and the second idler pulley located outboard to a second side of the drive sheave axis and downward relative thereto.

13. The apparatus of claim 12, wherein the first endless belt exerts a first lateral load on the drive sheave and the second endless belt exerts a second lateral load on the drive sheave, the second lateral load being opposite to the first lateral load.

14. The apparatus of claim 12, wherein a length of the first endless belt is substantially equal to a length of the second endless belt.

15. A mule drive apparatus for delivering power to a cutting deck attached to a lawn mowing vehicle, the apparatus comprising:

a drive sheave operable to engage a power take-off shaft of the vehicle, the drive sheave operable to rotate about a drive sheave axis;

a driven sheave adapted to couple to the cutting deck, the driven sheave operable to rotate about a driven sheave axis;

a first endless belt and a second endless belt, each of the first endless belt and the second endless belt operable to frictionally engage both the drive sheave and the driven sheave;

a first guide pulley positionable along a tension side of the first endless belt and a second guide pulley positionable along a tension side of the second endless belt; and a first idler pulley positionable along a slack side of the first endless belt and a second idler pulley positionable along a slack side of the second endless belt;

wherein, when the vehicle is in an operating configuration, the drive sheave axis is oriented parallel to a longitudinal axis of the vehicle, the first guide pulley and the first idler pulley are located outboard to a first side of the drive sheave axis and downward relative thereto, and the second guide pulley and the second idler pulley are located outboard to a second side of the drive sheave axis and downward relative to the drive sheave axis, where the second side transversely opposes the first side.

16. A mule drive apparatus for delivering power to a cutting deck attached to a lawn mowing vehicle, the apparatus comprising:

a drive sheave operable to engage a power take-off shaft of the vehicle, the drive sheave operable to rotate about a drive sheave axis;

a driven sheave adapted to couple to the cutting deck, the driven sheave operable to rotate about a driven sheave axis;

a first endless belt and a second endless belt, each of the first endless belt and the second endless belt operable to frictionally engage both the drive sheave and the driven sheave;

a first guide pulley positionable along a tension side of the first endless belt and a second guide pulley positionable along a tension side of the second endless belt; and a first idler pulley positionable along a slack side of the first endless belt and a second idler pulley positionable along a slack side of the second endless belt;

wherein the first guide pulley and the first idler pulley are, when the vehicle is in an operating configuration, located on a first side of a vertical plane containing the drive sheave axis, and the second guide pulley and the second idler pulley are located on a second side of the vertical plane.

17. The apparatus of claim 16, wherein the first guide pulley, the first idler pulley, the second guide pulley, and the second idler pulley are, when the vehicle is in the operating configuration, located on a first side of a horizontal plane passing through the drive sheave axis.

18. The apparatus of claim 17, wherein the first side of the horizontal plane is a lower side of the horizontal plane.

19. The apparatus of claim 16, wherein the first endless belt and the second endless belt are equal in length.

20. The apparatus of claim 16, wherein the power take-off shaft is powered by a prime mover coupled to the vehicle.

21. The apparatus of claim 16, wherein the driven sheave is operatively coupled to one or more cutting blades rotatably coupled to the cutting deck.

22. The apparatus of claim 16, wherein the drive sheave is located near a first end of the vehicle and the driven sheave is located, when the vehicle is in the operating configuration, underneath the vehicle.

23. A lawn mowing vehicle, comprising:

a cutting deck attached to the vehicle;

a prime mover attached to the vehicle and operable to provide power to at least the cutting deck; and a mule drive apparatus for delivering power to the cutting deck, the apparatus comprising:

a drive sheave engageable with a power take-off shaft of the prime mover, the drive sheave operable to rotate about a drive sheave axis;

a driven sheave coupled to the cutting deck, the driven sheave operable to rotate about a driven sheave axis;

a first endless belt and a second endless belt, each of the first endless belt and the second endless belt operable to wrap around and frictionally engage both the drive sheave and the driven sheave;

a first guide pulley positioned along a tension side of the first endless belt and a second guide pulley positioned along a tension side of the second endless belt; and a first idler pulley positioned along a slack side of the first endless belt and a second idler pulley positioned along a slack side of the second endless belt;

wherein, when the vehicle is in an operating configuration, the drive sheave axis is oriented parallel to a longitudinal axis of the vehicle, the first guide pulley and the first idler pulley are located outboard to a first side of the drive sheave axis and downward relative thereto, and the second guide pulley and the second idler pulley are located outboard to a second side of the drive sheave axis and downward relative to the drive sheave axis, wherein the second side transversely opposes the first side.

24. A lawn mowing vehicle, comprising:

a cutting deck attached to the vehicle;

a prime mover attached to the vehicle and operable to provide power to at least the cutting deck; and a mule drive apparatus for delivering power to the cutting deck, the apparatus comprising:

a drive sheave engageable with a power take-off shaft of the prime mover, the drive sheave operable to rotate about a drive sheave axis;

a driven sheave coupled to the cutting deck, the driven sheave operable to rotate about a driven sheave axis;

a first endless belt and a second endless belt, each of the first endless belt and the second endless belt operable to wrap around and frictionally engage both the drive sheave and the driven sheave;

a first guide pulley positioned along a tension side of the first endless belt and a second guide pulley positioned along a tension side of the second endless belt; and a first idler pulley positioned along a slack side of the first endless belt and a second idler pulley positioned along a slack side of the second endless belt;

wherein the first guide pulley and the first idler pulley are, when the vehicle is in an operating configuration, located on a first side of a vertical plane containing the drive sheave axis and the second guide pulley and the second idler pulley are located on a second side of the vertical plane.

25. The vehicle of claim 24, wherein the first guide pulley, the first idler pulley, the second guide pulley, and the second idler pulley are, when the vehicle is in the operating configuration, located between a horizontal plane passing through the drive sheave axis, and a ground surface.

26. The vehicle of claim 24, wherein the first guide pulley and the second guide pulley are coupled to the vehicle such that a rotational axis of each of the first guide pulley and the second guide pulley are substantially fixed relative to the vehicle.

27. The vehicle of claim 24, further comprising two or more engine mounts operable to couple the prime mover to a frame of the vehicle, wherein the two or more engine mounts each have a mount axis that intersects or approaches a horizontal axis of a rotational center of mass of the prime mover.

28. The vehicle of claim 27, wherein the two or more engine mounts each comprise an isolation pad operable to react, primarily in shear, rotational acceleration forces of the prime mover.

29. The vehicle of claim 27, wherein the two or more engine mounts comprise at least one central engine mount, wherein the at least one central engine mount has a central engine mount axis substantially parallel to a resultant force vector produced by the first endless belt and the second endless belt.

* * * * *